(12) United States Patent
Lasich

(10) Patent No.: US 7,589,302 B2
(45) Date of Patent: Sep. 15, 2009

(54) TRACKING SYSTEM

(75) Inventor: John Beavis Lasich, Deepdene (AU)

(73) Assignee: Solar Systems Pty. Ltd., Hawthorn, Victoria (AU)

( * ) Notice: Subject to any disclaimer, the term of this patent is extended or adjusted under 35 U.S.C. 154(b) by 301 days.

(21) Appl. No.: 10/557,453

(22) PCT Filed: May 19, 2004

(86) PCT No.: PCT/AU2004/000666

§ 371 (c)(1),
(2), (4) Date: Aug. 10, 2006

(87) PCT Pub. No.: WO2004/102083

PCT Pub. Date: Nov. 25, 2004

(65) Prior Publication Data

US 2007/0062516 A1    Mar. 22, 2007

Related U.S. Application Data

(60) Provisional application No. 60/471,344, filed on May 19, 2003.

(51) Int. Cl.
*G01C 21/02* (2006.01)
*F24J 2/38* (2006.01)

(52) U.S. Cl. .................. 250/203.4; 126/573; 250/203.1

(58) Field of Classification Search ............... 250/203.4; 136/243–246; 126/572–578
See application file for complete search history.

(56) References Cited

U.S. PATENT DOCUMENTS 4,108,019 A * 8/1978 Martin ........................ 74/469
4,586,488 A   5/1986 Noto
6,284,968 B1  9/2001 Niesyn

* cited by examiner

*Primary Examiner*—Georgia Y Epps
*Assistant Examiner*—Jennifer Bennett
(74) *Attorney, Agent, or Firm*—Merchant & Gould P.C.

(57) ABSTRACT

A tracking system for tracking an object, the system having a first axis and a second axis perpendicular to the first axis. The first axis is at an angle to the vertical such that the object (or equivalently its path) does not intersect the first axis.

22 Claims, 3 Drawing Sheets

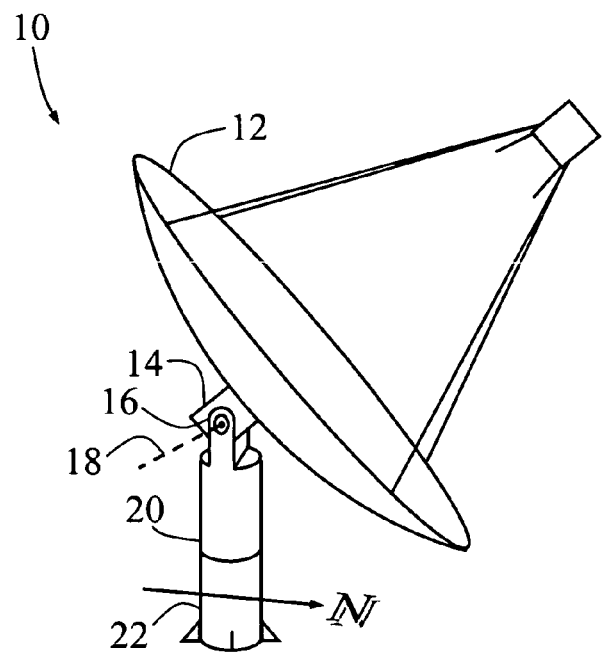
*Background Art*
Figure 1
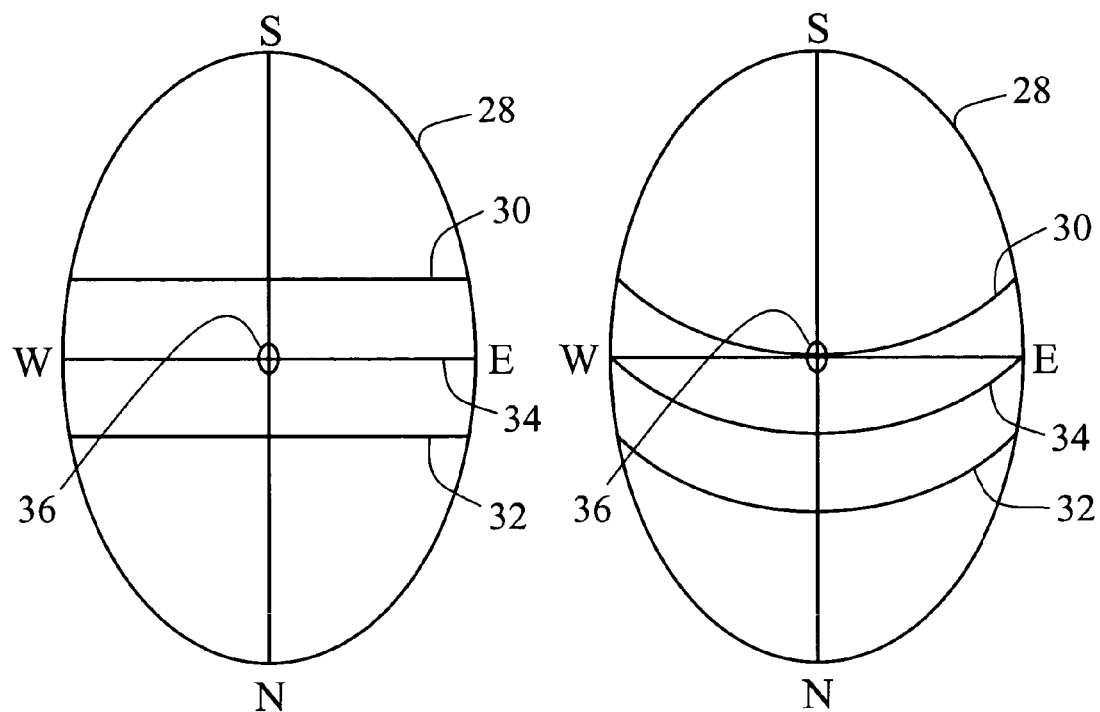
*Background Art*
Figure 2
*Background Art*
Figure 3

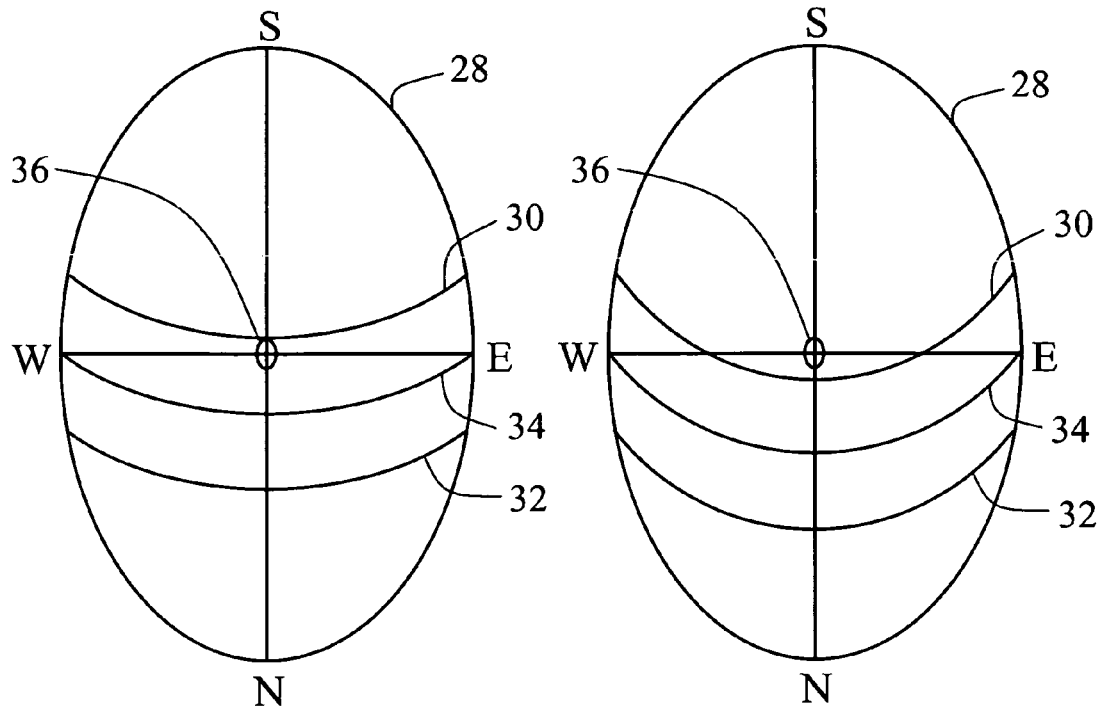
*Background Art*
Figure 4
*Background Art*
Figure 5
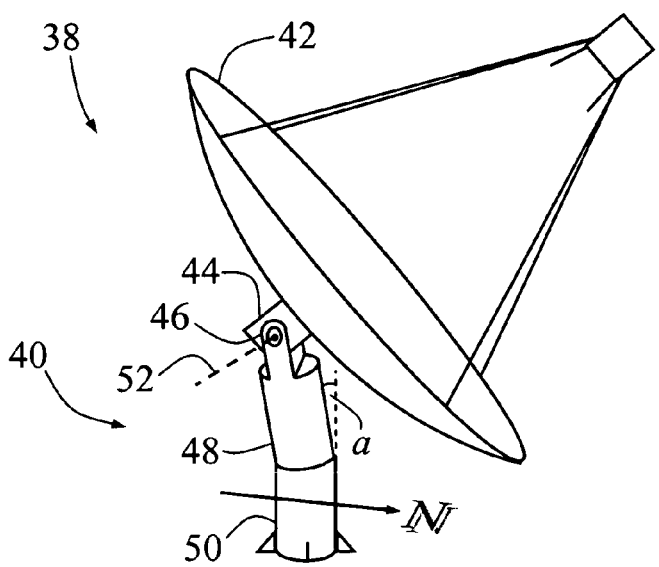
Figure 6

TRACKING SYSTEM

RELATED APPLICATION

This application is based on and claims the benefit of the filing date of U.S. provisional application Ser. No. 60/471,344 filed 19 May 2003, the contents of which is incorporated herein by reference in its entirety.

FIELD OF THE INVENTION

The present invention relates to a tracking system of particular but by no means exclusive application in tracking celestial objects such as the sun, and of particular use with a solar tracking system such as for use in solar power generation.

BACKGROUND OF THE INVENTION

An altitude-azimuth or "alt-azimuth" tracking system has two axes, a first axis that is vertical, about which the system rotates to a desired azimuth (or bearing) measured eastwards from north, and a second, horizontal axis (which itself rotates on the first axis), about which the system rotates to the desired altitude, i.e. angle above the horizon. With these two (vertical and horizontal) axes, the tracking system can point an instrument such as a telescope or solar power collector at any point above the horizon. By driving both axes in a suitable manner, that instrument can be held in alignment with the tracked object. This might comprise, for example, tracking the sun from sunrise to sunset.

An example of a background art solar energy collector with dish concentrator, mounted on an alt-azimuth tracking system and located in the southern hemisphere, is shown generally at 10 in FIG. 1. The dish concentrator 12 is located on a mount 14. The mount is supported in a yoke 16 which allows the mount 14 to rotate about horizontal axis 18. The yoke 16 is supported on a drum 20, rotatable about a vertical axis. The drum 20 is supported by a pylon 22. As illustrated, this arrangement 10 would be suitable for tracking the sun from the southern hemisphere and hence will more often than not be pointing (as shown) northwards.

However, if a tracked object passes directly overhead (viz. through the zenith) a problem can arise. For example, if the object is the sun, such an event will occur in the tropics (i.e. between latitude 23.5° north and 23.5° south) around two times of the year. On the equator, for example, this occurs at the vernal and autumnal equinoxes, that is, approximately 21 March and 21 September. As seen from the equator on the equinoxes, the sun rises due east (i.e. azimuth 90°, altitude 0°), and then sets due west (i.e. azimuth 270°, altitude 0°) essentially twelve hours later. For the first six hours, the altitude increases from 0 to 90° at 15° per hour, while for the second six hours the altitude decreases from 90° to 0° at the same rate. The azimuth remains at 90° for the first six hours and at 270° for the second six hours. To track the sun under these conditions, therefore, a conventional altitude-azimuth tracking system is required to rotate from azimuth 90° to azimuth 270° when the sun reaches zenith, essentially instantaneously. This, as will be appreciated by those in the art, is mechanically impossible.

Consequently, while the first (or vertical) axis of the tracking system is rotating from azimuth 90° to azimuth 270°, a period without effective tracking can occur. In the example of a solar power generator, this can lead to a loss in power output.

It must also be borne in mind that altitude-azimuth tracking systems have motors adapted for their application, and hence generally have limited power and therefore speed. For a solar tracking system, these motors are designed to drive the two axes relatively slowly, and it would typically be necessary to employ more powerful motors if it were desired to compensate for the above described problem by driving the tracking system at a faster rate than usual and thereby minimising any tracking delay.

As will also be appreciated, this problem does not arise if an equatorial or polar mount is employed, but altitude-azimuth mounts have advantages (in terms of cost, and ease of construction and erection) that make them highly desirable and widely used.

If this problem is experienced, accurate tracking can recommence after the delay caused by this effect, and the delay (in which data for energy collection is interrupted or reduced) depends on the maximum speed with which the tracking system can switch azimuth from 90° to 270°.

For example, if the maximum azimuth tracking speed is 38° per minute, then to drive the azimuth from 90° to 270° (i.e. by 180°) would take 180° divided by 38° per minute, or 4.74 minutes. If the sun is being tracked, over the course of 4.74 minutes the sun will have moved 1.18°. A zone of 1.18° diameter, centred on the vertical tracking axis projected on the sky, will thus have been either lost or have afforded reduced energy collection.

Owing to the sun's seasonal motion, which is approximately sinusoidal, it dwells longer at the tropics than at the equator. Consequently, for a solar tracking system located on or near the tropics of Capricorn and Cancer, this problem can occur over a series of days around the solstices. On the equator, the problem should occur over fewer days, around the equinoxes.

FIG. 2 illustrates the problem for a solar tracking system with the above characteristics located on the equator. This figure (and FIGS. 3, 4, 5, 7 and 8) are polar diagrams of the sky with the zenith at the centre and the horizon at the circumference 28, with north (N) at the bottom. South (S), east (E) and west (W) are also indicated, as are the sun's track 30 on 21 December (the northern hemisphere winter solstice) at declination −23.5°, the sun's track 32 on 21 June (the northern hemisphere summer solstice) at declination +23.5°, and the sun's track 34 on 21 March and 21 September (the equinoxes) at declination 0°.

The above mentioned zone of 1.18° diameter, above the vertical tracking axis, is indicated (though not to scale) at 36. As can be seen from this figure, this zone 36 is located (for a solar tracking system at latitude 0°) on the celestial equator, and hence is entered by the sun around noon on and around the time of the equinoxes.

For the same solar tracking system located at latitude 23.5° south (such as Alice Springs, in the Northern Territory, Australia), the situation is as depicted in FIG. 3. Zone 36 is located at declination −23.5°, so the sun passes through zone 36 when on solar track 30, that is, on and around the northern hemisphere winter solstice (or southern hemisphere summer solstice) around 21 December.

Thus, this zone 36 is centred on or between the declination −23.5° and +23.5°, with the worst case (in this scenario) occurring when the outer edge of the zone 36 falls on or near these extremes. This occurs, again for this example, when the centre of zone 36 is located at declination (23.5−1.18/2)=±22.91°. Because the sun dwells around the tropics, it will pass into the declination of this zone 36 as it approaches the tropics, and back into that declination, so that there may be weeks around the solstice when the sun passes through zone 36 and this tracking problem arises. This situation is depicted for a tracking system located at latitude 22.91° south in FIG. 4.

Finally, for the same solar tracking system located outside the tropics, the problem does not occur. Thus, for the same solar tracking system located at Melbourne, Victoria, Australia (i.e. latitude 37.5° south), the sun never approaches zone 36 (which lies at declination—37.5°), as my be seen from FIG. 5.

SUMMARY OF THE INVENTION

The present invention provides, therefore, a tracking system for tracking a celestial object for use in a location where the object passes through or near the zenith, comprising:
- a first axis for tracking the object generally in azimuth; and
- a second axis for tracking the object generally in altitude and perpendicular to the first axis;
- wherein the first axis is oriented at an angle to the vertical so that an upward projection of the first axis is removed from the annual apparent path of the object by an amount that renders the speed of the tracking system sufficient to maintain tracking of the object as the object passes through or near the zenith.

Thus, the object—which being celestial has an apparent motion and therefore path—should not pass through the first axis. When the object is the sun, for example, the ecliptic plane (being the path of the sun) should not be parallel to the first axis.

Preferably said angle has a component of at least A in a direction away from the equator, where:

$$A = 23.5° - |\lambda| + \frac{45°}{2\sigma}$$

and where $\lambda$ is the latitude of said tracking system and $\sigma$ is the maximum angular velocity with which said tracking system can evolve said first axis in degrees per minute.

More preferably, said angle has a component at least 2° (and still more preferably at least 5°) greater than A in a direction away from the equator. Most preferably said angle has a component greater than A in a direction away from the equator determined so as to minimize the additional cost associated with high tolerance or mechanical demands.

Thus, if the tracking system is used in a location where this problem arises (i.e. where the sun passes overhead or nearly so), tilting the first (i.e. in a conventional alt-azimuth tracking system, vertical) axis by at least A will prevent this occurring.

The tracking system may include at least one photosensor (possibly in the form of a thermal sensor) for sensing light (including infrared radiation) received—either directly or indirectly—from a tracked object to refine the tracking of the object.

Thus, arranging the first axis at an angle to the vertical will generally introduce an error in the tracking, but this can be compensated for if necessary by providing a photosensor locked to the tracked object and operable to adjust the tracking of the tracking system.

In one embodiment, the system tracks said object by means of suitably calculated tables or progressive calculation.

Alternatively, the system tracks said object by means of altitude-azimuth tables or calculations, translated on the basis of said angle to values appropriate for said first and second axes.

The present invention also provides a tracking system for tracking a celestial object for use in a location where the object passes through or near the zenith, comprising:
- a first axis for tracking the object generally in azimuth;
- a second axis for tracking the object generally in altitude and perpendicular to said first axis; and
- adjustment means for adjusting the angle of said first axis to the vertical;
- whereby said angle can be adjusted so that an upward projection of said first axis is removed from the annual apparent path of the object by an amount that renders the speed of said tracking system sufficient to maintain tracking of the object as the object passes through or near the zenith.

Preferably said angle has a component of at least A in a direction away from the equator, where:

$$A = 23.5° - |\lambda| + \frac{45°}{2\sigma}$$

and where $\lambda$ is the latitude of said tracking system and $\sigma$ is the maximum angular velocity with which said tracking system can evolve said first axis in degrees per minute.

The present invention still further provides a method for tracking a celestial object for use in a location where the object passes through or near the zenith, comprising:
- arranging a first axis for tracking the object generally in azimuth;
- arranging a second axis for tracking the object generally in altitude perpendicular to said first axis; and
- orienting said first axis at an angle to the vertical so that an upward projection of said first axis is removed from the annual apparent path of the object by an amount that renders the speed of said tracking system sufficient to maintain tracking of the object as the object passes through or near the zenith.

Preferably said angle has a component of at least A in a direction away from the equator, where:

$$A = 23.5° - |\lambda| + \frac{45°}{2\sigma}$$

and where $\lambda$ is the latitude of said tracking system and $\sigma$ is the maximum angular velocity with which said tracking system can evolve said first axis in degrees per minute.

More preferably, the angle has a component at least 2° (and still more preferably at least 5°) greater than A in a direction away from the equator. Most preferably the angle has a component greater than A in a direction away from the equator determined so as to minimize the additional cost associated with high tolerance or mechanical demands.

The invention still further provides a method for providing a tracking system for tracking a celestial object at a location where the object passes through or near the zenith, comprising:
- providing at said location an alt-azimuth tracking system having an azimuth axis and an altitude axis; and
- arranging said alt-azimuth tracking system so that said azimuth axis is oriented at an angle to the vertical so that an upward projection of said azimuth axis is removed from the annual apparent path of the object by an amount that renders the speed of said tracking system sufficient to maintain tracking of the object as the object passes through or near the zenith.

BRIEF DESCRIPTION OF THE DRAWINGS

In order that the present invention may be more clearly ascertained, an embodiment will now be described, by way of example, with reference to the accompanying drawing, in which:

FIG. 1 is a view of an exemplary background art solar energy collector with dish concentrator, mounted on an alt-azimuth tracking system;

FIG. 2 is a polar diagram of the sky with horizon at the circumference, depicting the region where the sun cannot be adequately tracked by means of an exemplary background art solar energy collector located at the equator;

FIG. 3 is a polar diagram of the sky with horizon at the circumference, depicting the region where the sun cannot be adequately tracked by means of an exemplary background art solar energy collector located at Alice Springs (latitude 23.5° south);

FIG. 4 is a polar diagram of the sky with horizon at the circumference, depicting the region where the sun cannot be adequately tracked by means of an exemplary background art solar energy collector located at the 22.91° south;

FIG. 5 is a polar diagram of the sky with horizon at the circumference, depicting that there is no region where the sun cannot be adequately tracked for an exemplary background art solar energy collector located at in Melbourne (latitude 37.5° south);

FIG. 6 is a view of a solar energy collector with dish concentrator with a tracking system according to an embodiment of the present invention;

DETAILED DESCRIPTION

Figure 7:
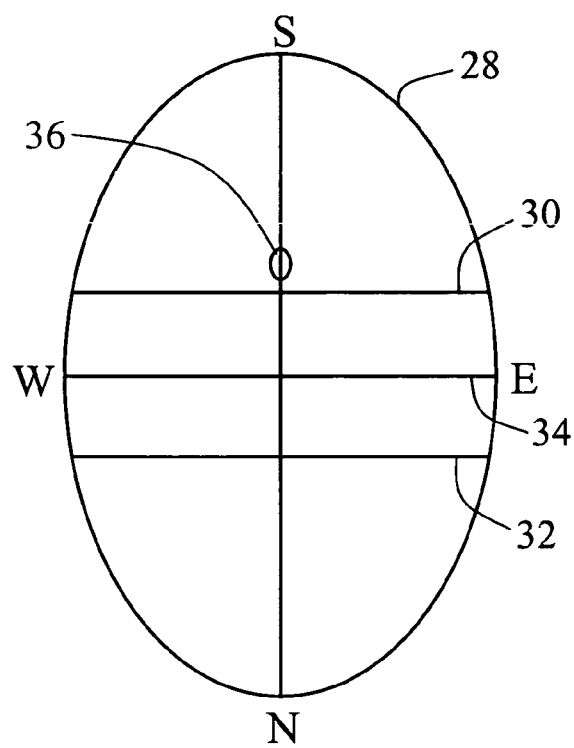
FIG. 7 is a polar diagram of the sky with horizon at the circumference, depicting that there is no region where the sun cannot be adequately tracked for the solar energy collector of FIG. 6 located at the equator.

According to this embodiment, a solar tracking system is provided with a maximum tracking speed in what—in an alt-azimuth tracking system—would be the vertical axis of 38° per minute. As discussed above, this maximum speed creates a zone of 1.18° diameter located about what would be—in the prior art—the projection of the vertical axis, in which inadequate solar tracking is possible. Consequently, the solar tracking system of this embodiment endeavours to avoid the sun ever passing within a zone of 1.18° diameter of that axis.

FIG. 6 is a view of a solar energy collector 38 located in the southern hemisphere within the tropics, with dish concentrator with the solar tracking system of this embodiment, the tracking system generally at 40. The solar energy collector is generally identical with that of FIG. 1, including a dish concentrator 42 and mount 44.

Tracking system 40 comprises essentially the same components as that of FIG. 1, including yoke 46, drum 48 and pylon 50. However, drum 48 is not rotatable about a vertical axis but is tilted in a southwards direction so that it is rotatable about an axis tilted by an angle a to the vertical.

The minimum value of a is determined as follows.

Because the collector is located in the tropics, a vertical axis for drum 48 would position the problematic zone of the sky described above (in which no adequate tracking is possible with a prior art alt-azimuth tracking system) about the zenith, through which the sun will eventually pass. The axis of drum 48 (which defines where this zone lies) should thus avoid that part of the sky 23.5° either side of the celestial equator, as well as a further half-diameter of the zone. This ensures that, despite its finite size, the zone does not extend to the sun when the sun is at located at 23.5° south.

The sun will pass further south than the zenith by at most $23.5°-|\lambda|$, to which should be added half the diameter of this zone. The zone has a diameter equal to the distance the sun moves while the tracking of a prior art alt-azimuth system—at its maximum speed—changes azimuth from 90° to 270°. This takes 180°/σ, where σ is the maximum angular velocity with which the tracking system can evolve the first in degrees per minute (the first axis being—in prior art alt-azimuth systems—the vertical axis). In this example this is 38° per minute. The sun moves at 15° per hour or 0.25° per minute, so it moves (0.25×180/σ)=45°/σ in this time, which is accordingly the diameter of this zone.

Thus, what in the prior art is the vertical axis should avoid a region of the sky from $[23.5°-|\lambda|+45°/2\sigma]$ south of the zenith to $[23.5°+|\lambda|+45°/2\sigma]$ north of the zenith in order not to intersect this zone.

Thus, drum 48 is tilted to the vertical by angle a so that this zone is never intersected by the axis of drum 48. This is done by arranging drum 48 with a tilt in a southern direction of:

$$a=23.5°-|\lambda|+45°/2\sigma$$

Hence, the tracking system 40 has a first axis tilted away from the direction of the equator of a, while its second axis 52 (through yoke 46) is perpendicular to this first axis. In prior art alt-azimuth arrangements, this second axis is horizontal; in system 40 it will precess such that, when the system 40 points northwards (as shown in FIG. 6), it is horizontal. This will also be so when the system 40 points southwards. Otherwise the second axis will be inclined to the horizontal.

Inclination a of the first axis means that alt-azimuth solar position tables or calculations must be modified if they are to be used for system 40, but this is a straightforward spherical geometry transformation. Alternatively, entirely new tables can be generated, or calculations performed as necessary, by means of a suitably programmed computer-control drive system.

The collector 38 is also preferably provided with one or more photosensors for trimming the tracking of the system 40, and these can also be used to correct the effect of using alt-azimuth solar position calculations. Alternatively, these photosensors can be used to fine tune more accurate tables or calculations created or performed correctly for the system 40 and taking into account the effect of the inclination of the first axis.

FIG. 7 is a polar diagram of the sky (with horizon at the circumference) for this embodiment, with the collector 38 located at the equator and with a first axis tilted southwards from the vertical by 27°. The above calculation of a for system 40 gives a value of a=24.1°. This value of a is treated as a minimum value for the inclination of the first axis. It should be remembered that setting the inclination of the first axis precisely according to this calculation would require the tracking system 40 to be driven at its maximum speed until the Sun has moved out of the avoided zone, and assumes that pylon 50 has been constructed precisely vertically. It also makes no allowance for wear or sagging in the various components of the collector 38 with aging, or other imperfections.

Consequently, while this calculation provides for the angle at which the first axis should—in a ideal system—be inclined to the vertical; in practice the first axis is inclined by a few degrees more and hence at 27° in FIG. 7, to ensure that the zone 36 remains well clear of the sun's path at all times of the year.

Figure 8:
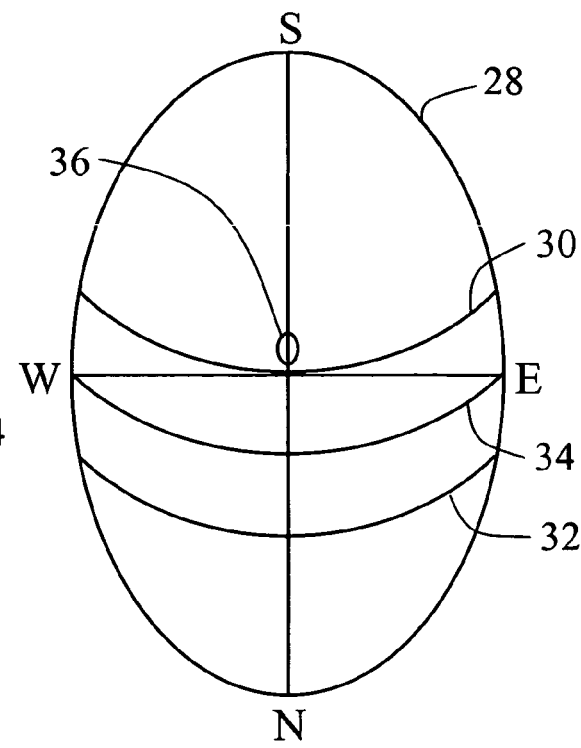
FIG. 8 is a polar diagram of the sky with horizon at the circumference, depicting that there is no region where the sun cannot be adequately tracked for the solar energy collector of FIG. 6 located at Alice Springs (latitude 23.5° south).

FIG. 8 is another polar diagram of the sky (with horizon at the circumference) for this embodiment, with the collector 38 located at Alice Springs, latitude 23.5° south. The above calculation of a for system 40 at this latitude gives a value of a=0.59°. As discussed above, this figure provides the inclination of the first axis in an ideal arrangement but, in practice, the first axis should be inclined by a few degrees more to allow for the factors described above. Hence, FIG. 8 depicts an inclination of drum 48 and hence of the first axis of 5°. Again, this inclination ensures that the zone 36 remains well clear of the sun's path at all times of the year.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, i.e. to specify the presence of the stated features but not to preclude the presence or addition of further features in various embodiments of the invention.

Any reference herein to prior art is not intended to imply that that prior art forms or formed a part of the common general knowledge.

The invention claimed is:

1. A tracking system for tracking a celestial object for use in a location where the object passes through or near the zenith, comprising:
  a first axis for tracking the object, said first axis being offset from vertical; and
  a second axis for tracking the object, said second axis being substantially perpendicular to said first axis;
  wherein said first axis is offset from the vertical by an angle that removes an upward projection of said first axis from the apparent path of the object by an amount that renders an overall speed of said tracking system sufficient to maintain tracking of the object as the object passes through or near the zenith;
  wherein said angle has a component of at least A in a direction away from the equator, where:

$$A = 23.5° - |\lambda| + \frac{45(\text{degrees}^2/\text{min})}{2\sigma}$$

and where $\lambda$ is the latitude of said tracking system and $\sigma$ is the maximum angular velocity with which said tracking system can evolve said first axis in degrees per minute.

2. A system as claimed in claim 1, wherein said angle has a component at least 2° greater than A in a direction away from the equator.

3. A system as claimed in claim 1, wherein said angle has a component at 5° greater than A in a direction away from the equator.

4. A system as claimed in claim 1, wherein said angle has a component greater than A in a direction away from the equator determined so as to minimize the additional cost associated with high tolerance or mechanical demands.

5. A system as claimed in claim 1, further comprising at least one photosensor for sensing light received either directly or indirectly from a tracked object to refine the tracking of said object.

6. A system as claimed in claim 1, operable to track said object by means of suitably calculated tables or progressive calculation.

7. A system as claimed in claim 1, operable to track said object by means of altitude-azimuth tables or calculations, translated on the basis of said angle to values appropriate for said first and second axes.

8. A tracking system as claimed in claim 1, wherein said angle removes said upward projection of said first axis from the apparent path of the object by an amount that renders an azimuthal speed of said tracking system sufficient to maintain tracking of the object as the object passes through or near the zenith.

9. A tracking system for tracking a celestial object for use in a location where the object passes through or near the zenith, comprising:
  a first axis for tracking the object, said first axis being offset from vertical;
  a second axis for tracking the object, said second axis being substantially perpendicular to said first axis; and
  adjustment means for adjusting an angle of offset of said first axis from the vertical;
  whereby said angle can be adjusted so that an upward projection of said first axis is removed from the apparent path of the object by an amount that renders an overall speed of said tracking system sufficient to maintain tracking of the object as the object passes through or near the zenith;
  wherein said angle has a component of at least A in a direction away from the equator, where:

$$A = 23.5° - |\lambda| + \frac{45(\text{degrees}^2/\text{min})}{2\sigma}$$

and where $\lambda$ is the latitude of said tracking system and $\sigma$ is the maximum angular velocity with which said tracking system can evolve said first axis in degrees per minute.

10. A tracking system as claimed in claim 9, wherein said angle removes said upward projection of said first axis from the apparent path of the object by an amount that renders an azimuthal speed of said tracking system sufficient to maintain tracking of the object as the object passes through or near the zenith.

11. A method for tracking a celestial object for use in a location where the object passes through or near the zenith, comprising:
  arranging a first axis for tracking the object, said first axis being offset from vertical;
  arranging a second axis for tracking the object, said second axis being substantially perpendicular to said first axis; and
  orienting said first axis at an angle of offset from the vertical so that an upward projection of said first axis is removed from the apparent path of the object by an amount that renders an overall speed of said tracking system sufficient to maintain tracking of the object as the object passes through or near the zenith;
  wherein said angle has a component of at least A in a direction away from the equator, where:

$$A = 23.5° - |\lambda| + \frac{45(\text{degrees}^2/\text{min})}{2\sigma}$$

and where λ is the latitude of said tracking system and σ is the maximum angular velocity with which said tracking system can evolve said first axis in degrees per minute.

12. A method as claimed in claim 11, wherein said angle has a component at least 2° greater than A in a direction away from the equator.

13. A method as claimed in claim 11, wherein said angle has a component at 5° greater than A in a direction away from the equator.

14. A method as claimed in claim 11, wherein said angle has a component greater than A in a direction away from the equator determined so as to minimize the additional cost associated with high tolerance or mechanical demands.

15. A method as claimed in claim 11, including orienting said first axis at an angle of offset from the vertical so that said upward projection of said first axis is removed from the apparent path of the object by an amount that renders an azimuthal speed of said tracking system sufficient to maintain tracking of the object as the object passes through or near the zenith.

16. A method for providing a tracking system for tracking a celestial object at a location where the object passes through or near the zenith, comprising:
providing at said location an alt-azimuth tracking system having an azimuth axis and an altitude axis; and
arranging said alt-azimuth tracking system so that said azimuth axis is oriented at an angle to the vertical so that an upward projection of said azimuth axis is removed from the apparent path of the object by an amount that renders an overall speed of said tracking system sufficient to maintain tracking of the object as the object passes through or near the zenith;
wherein said angle has a component of at least A in a direction away from the equator, where:

$$A = 23.5° - |\lambda| + \frac{45(\text{degrees}^2/\text{min})}{2\sigma}$$

and where λ is the latitude of said tracking system and σ is the maximum angular velocity with which said tracking system can evolve said first axis in degrees per minute.

17. A tracking system for tracking a celestial object for use in a location where the object passes through or near the zenith, comprising:
a first axis for tracking the object, said first axis being offset from vertical; and
a second axis for tracking the object in substantially altitude, said second axis being substantially perpendicular to said first axis;
wherein said first axis is offset from the vertical by an angle that removes an upward projection of said first axis from the apparent path of the object by an amount that renders an overall speed of said tracking system sufficient to maintain tracking of the object as the object passes through or near the zenith, wherein said angle has a component of at least A in a direction away from the equator, where:

$$A = 23.5° - |\lambda| + \frac{45(\text{degrees}^2/\text{min})}{2\sigma}$$

and where λ is the latitude of said tracking system and σ is the maximum angular velocity with which said tracking system can evolve said first axis in degrees per minute.

18. A tracking system as claimed in claim 17, wherein said angle removes said upward projection of said first axis from the apparent path of the object by an amount that renders an azimuthal speed of said tracking system sufficient to maintain tracking of the object as the object passes through or near the zenith.

19. A tracking system for tracking a celestial object for use in a location where the object passes through or near the zenith, comprising:
a first axis for tracking the object, said first axis being offset from vertical; and
a second axis for tracking the object, said second axis being substantially perpendicular to said first axis;
adjustment means for adjusting an angle of offset of said first axis from the vertical;
whereby said angle can be adjusted so that an upward projection of said first axis is removed from the apparent path of the object by an amount that renders an overall speed of said tracking system sufficient to maintain tracking of the object as the object passes through or near the zenith, and said angle has a component of at least A in a direction away from the equator, where:

$$A = 23.5° - |\lambda| + \frac{45(\text{degrees}^2/\text{min})}{2\sigma}$$

and where λ is the latitude of said tracking system and σ is the maximum angular velocity with which said tracking system can evolve said first axis in degrees per minute.

20. A tracking system as claimed in claim 19, wherein said angle removes said upward projection of said first axis from the apparent path of the object by an amount that renders an azimuthal speed of said tracking system sufficient to maintain tracking of the object as the object passes through or near the zenith.

21. A method for tracking a celestial object for use in a location where the object passes through or near the zenith, comprising:
arranging a first axis for tracking the object, said first axis being offset from vertical;
arranging a second axis for tracking the object, said second axis being substantially perpendicular to said first axis; and
orienting said first axis at an angle of offset from the vertical so that an upward projection of said first axis is removed from the apparent path of the object by an amount that renders an overall speed of said tracking system sufficient to maintain tracking of the object as the object passes through or near the zenith;
wherein said angle has a component of at least A in a direction away from the equator, where:

$$A = 23.5° - |\lambda| + \frac{45(\text{degrees}^2/\text{min})}{2\sigma}$$

and where λ is the latitude of said tracking system and σ is the maximum angular velocity with which said tracking system can evolve said first axis in degrees per minute.

22. A method as claimed in claim 21, including orienting said first axis at an angle of offset from the vertical so that said upward projection of said first axis is removed from the apparent path of the object by an amount that renders an azimuthal speed of said tracking system sufficient to maintain tracking of the object as the object passes through or near the zenith.

* * * * *